United States Patent [19]

Hiraiwa et al.

[11] Patent Number: 4,686,774

[45] Date of Patent: Aug. 18, 1987

[54] METHOD FOR DEHYDRATION OF A COMPOSITION OF A FINE POWDER AND WATER

[75] Inventors: Tadashi Hiraiwa; Eizi Ando, both of Shiojiri, Japan

[73] Assignee: Showa Denko K.K., Tokyo, Japan

[21] Appl. No.: 901,386

[22] Filed: Aug. 28, 1986

[30] Foreign Application Priority Data

Sep. 2, 1985 [JP] Japan .............................. 60-191964

[51] Int. Cl.[4] ......................... F26B 5/16; B01D 12/00

[52] U.S. Cl. .......................................... 34/9; 134/12; 134/109

[58] Field of Search .................. 134/10, 12, 105, 109; 34/9

[56] References Cited

U.S. PATENT DOCUMENTS 4,599,807 7/1986 Wells et al. .............................. 34/9

FOREIGN PATENT DOCUMENTS 59-38367 3/1984 Japan .

59-38366 3/1984 Japan .

*Primary Examiner*—Larry T. Schwartz

*Attorney, Agent, or Firm*—Oblon, Fisher, Spivak, McClelland, & Maier

[57] ABSTRACT

From a composition of a fine powder and water, a fine powder minimally susceptible of agglomeration is obtained by a method which comprises adding to the composition of a fine powder and water a water-insoluble organic solvent at least in an amount enough for consequently forming an azeotropic composition with respect to the amount of the water involved, converting the resulting mixed liquid into a W/O type emulsion, and removing the water and the organic solvent from the emulsion.

12 Claims, No Drawings

METHOD FOR DEHYDRATION OF A COMPOSITION OF A FINE POWDER AND WATER

FIELD OF THE INVENTION AND RELATED ART STATEMENT

This invention relates to a method for the dehydration of a composition of a fine powder and water, i.e. a wet powder, a water-containing fine powder of ceramic or metal substance, a colloidal solution, or a precipitate such as salt or a hydrated substance. This method is suitable for the production of a fine powder possessing a conspicuously low agglomerate force.

The wet powder which is obtained by the conventional liquid phase method generally has a primary particle diameter of not more than 1μ. Generally when the wet powder in a state containing water is dried by heating, strong agglomeration of primary particles occurs during the course of drying. To obtain a fine powder as a finished product, therefore, the drying operation requires an additional step of pulverizing aggregates of particles.

As means of precluding the agglomeration of particles during the course of drying, Japanese Patent Publication SHO No. 59(1984)-38366 and Japanese Patent Publication SHO No. 59(1984)-38367 disclose a method which comprises admixing the precipitate of hydration or the colloidal solution resulting from hydrolysis with an organic solvent and subjecting the resulting mixture to thermal distillation thereby effecting dehydration. When the organic solvent used in this method is of a water-soluble type, it is required to be used in an excess amount. Further, since the solvent in use dissolves water, the solvent which is separated for recovery is required to be distilled for expulsion of water before it is put to use again. Thus, the method involves a complicated procedure and does not prove economical. The aforementioned patent publications mention usability of a water-insoluble organic solvent for the distillation. When the water-insoluble organic solvent is simply admixed with the water-containing precipitate, for example, the resulting mixture separates into two phases and the minute particles occur in the water phase.

When the mixture in this state is subjected to distillation by heating, the water and the organic solvent jointly separate in the form of an azeotropic composition and the minute particles are concentrated as held in the water phase. As the water continues to decrease through distillation, the particles are liable to agglomerate into coarse clusters.

Further, adoption of the freeze drying method (evaporation of a wet powder under a vacuum in a frozen state) might be considered. This method, however, is deficient in productivity and economy.

The dehydration by the use of a water-soluble organic solvent has the disadvantage that it entails heavy consumption of the organic solvent and inevitably necessitates difficult separation of water from the organic solvent after the distillation. When a water-insoluble organic solvent is used for the dehydration, no fully effective dehydration is obtained simply by mixing the wet powder with the organic solvent and distilling the resulting mixture.

OBJECT AND SUMMARY OF THE INVENTION

In the removal of water from a composition consisting of water and a fine powder, this invention aims to provide a method which is highly effective in preventing the dehydrated fine powder from agglomeration and is capable of minimizing the consumption of a solvent.

To attain the object described above according to this invention, there is provided a method which comprises admixing a given composition consisting of water and a fine powder, i.e. a water-containing fine powder of ceramic or metal substance, a colloid solution, or a precipitate such as a salt or a hydration product, (hereinafter referred to as "wet fine powder") with a water-insoluble organic solvent at least in an amount enough for consequently forming an azeotropic composition with respect to the amount of the water present in the wet fine powder, thereby converting the resulting mixed liquid into a W/O type emulsion, and removing the water and the organic solvent from the emulsion.

DETAILED DESCRIPTION OF THE PREFERRED EMBODIMENT

This invention first adds a water-insoluble organic solvent to a given composition of a fine powder and water. The amount of the organic solvent is such that the added organic solvent forms an azeotropic mixture with the water present in the given composition. It may be greater than is enough for consequently forming the azeotropic mixture. Most efficiently, the amount of the added organic solvent should produce an azeotropic mixture of water and organic solvent system. Generally, the organic solvent has a weaker surface tension than water and, during the course of drying, manifests a weak force in causing agglomeration of particles of the fine powder. Even if the organic solvent causes some agglomeration, the clusters of particles can be readily disintegrated into minute particles after completion of the drying operation.

In the present invention, carbon tetrachloride, toluene, xylene, or benzene which is insoluble in water is used as the organic solvent. When this organic solvent is used, the solvent recovered can be separated from the water simply through quiescent standing and then put to use again in the unmodified state. This procedure for recycling the organic solvent can be repeated many times.

In the present invention, the organic solvent is not meant for simple mixture with the water present in the composition but is intended to fulfill the characteristic function of forming a W/O type emulsion jointly with the water. When the water-insoluble organic solvent is added at random to the composition of a fine powder and water, they spontaneously separate from each other. Even when they are stirred to facilitate their mixture, they quickly separate. When they are subjected to dehydration, there inevitably ensues agglomeration of minute particles. To preclude this problem, this invention causes them to form an emulsion either mechanically or preferably by the forced addition of a surfactant. The surfactant may be of an anionic, cationic, or non-ionic type. Particularly desirable results are obtained when HLB is formulated within the range of 3 to 10.

The emulsion formed as described above is a W/O type emulsion in which water is dispersed in the form of droplets of about 1μm in diameter in the organic solvent.

Then, this emulsion is deprived of water and the organic solvent by the vaporization method such as by distillation under an atmospheric pressure or under a reduced pressure. Preferably, it is carried out by the vacuum spray method. When the heating is continued after the distillation, there is obtained a dry powder. The powder thus obtained sparingly contains clusters of agglomerating particles. It consists mostly of minute particles of diameters not exceeding 1μ. The substantial absence of clusters of agglomerating particles is possibly due to the fact that the minute particles of the powder are mostly present in the droplets of water about 1μm in diameter dispersed in the emulsion and that these droplets of water are surrounded by the solvent so that the particles cannot grow to a size greater than the droplet even after the emulsion has been dehydrated by distillation.

The method of this invention can be applied to the production of a fine powder of such ceramic material as alumina, zirconia, or mullite.

The working of the present invention brings about the following effects.

(1) A fine powder containing no clusters of agglomerating particles is obtained.

(2) The used organic solvent can be recovered with great ease and the recovered organic solvent necessitates no treatment of distillation and can be put in its unmodified form to re-use. Thus, the method of this invention proves economical in terms of the use of the organic solvent.

(3) Since the organic solvent fulfills its purpose by forming the azeotropic mixture with the water of the wet powder, it can be used effectively in a relatively small amount in the method of the present invention.

EXAMPLE 1

A mixed sol of mullite composition was prepared by mixing an alumina sol of a concentration of 20% obtained by dispersing 200 g of boehmite in 800 ml of water adjusted to pH 2-4 with nitric acid and 270 g of silica sol of a concentration of 20%. This mixed sol and 5950 ml of toluene and 40 ml of a nonionic surfactant (produced by Dai-ichi Kogyo Seiyaku Co., Ltd. and marketed under trademark designation of "Neugen") added thereto were stirred to form an emulsion.

The azeotropic composition between toluene and water was formed of 80.4% by weight of toluene and 19.6% by weight of water. In the mixture prepared above, the toluene content was 83.8% by weight and the water content was 16.2% by weight.

The emulsion was heated to 130° C. and spray dried in a chamber kept under 50 Torrs.

The powder consequently obtained consisted of minute particles of an average diameter of 0.8μ and a specific surface area of 280 $m^2/g$ sparingly containing clusters of agglomerating particles. The liquid recovered by a condenser, on 2 to 3 minutes' quiescent standing, separated into water and toluene. The toluene separated by removal of the underlying water phase could be put to re-use in its unmodified form.

EXAMPLE 2

A mixed sol of mullite composition was prepared by following the procedure of Example 1. This mixed sol and 4726 ml of toluene corresponding to the amount for consequently forming an azeotropic composition of water and toluene and 35 ml of the same surfactant as used in Example 1 were stirred to form an emulsion. This emulsion was heated to 100° C. and subjected to distillation under a vacuum of 80 Torrs. The consequently produced powder had an average particle diameter of 3.5μ. After 2 hours' disintegration with a ball mill, the powder consisted of minute particles having an average particle diameter of 1.0μ and a relative surface area of 230 $m^2/g$. The disintegration proceeded easily.

COMPARATIVE EXPERIMENT 1

A mixed sol of mullite composition was prepared by following the procedure of Example 1. When the sol and toluene added thereto similarly to Example 1 were stirred, no emulsion was formed. The mixed sol and the toluene were separated from each other in 2 to 3 minutes of standing after the stirring. The mixture was subjected to distillation similarly to Example 2. The dried product consisted of lumps several mm to 20 mm in diameter and required disintegration. After 24 hours' disintegration in a ball mill, there was obtained a powder having an average particle diameter of 1.8μ and a specific surface area of 180 $m^2/g$.

What is claimed is:

1. A method for removing water from a composition consisting essentially of water and a fine ceramic powder, which comprises:

(a) adding to said composition a water-insoluble organic solvent at least in an amount sufficient to form an azeotrope with the water in said composition, (b) converting the resulting mixed liquid into a W/O emulsion having minute ceramic particles contained in water droplets suspended in said emulsion, and (c) removing the water and organic solvent from said emulsion.

2. The method according to claim 1, wherein the amount of said organic solvent added to said composition is sufficient to form an azeotrope with the water in said composition.

3. The method according to claim 1, wherein said water-insoluble organic solvent is selected from the group consisting of carbon tetrachloride, toluene, xylene, and benzene.

4. The method according to claim 1, wherein said removal of water and organic solvent from said emulsion is effected by distillation.

5. The method according to claim 1, wherein the organic solvent is recovered from the water by quiescent standing.

6. The method according to claim 1, wherein the removal of water and organic solvent from said emulsion is effected by a vacuum spray method.

7. The method according to claim 1, wherein said resulting mixed liquid is converted to a W/O emulsion either mechanically or by the addition of a surfactant.

8. The method according to claim 7, wherein said surfactant is an anionic, a cationic or non-ionic surfactant.

9. The method according to claim 8, wherein said emulsion formed has a HLB within the range of 3 to 10.

10. The method according to claim 8, wherein said emulsion formed has water dispered in the form of droplets which are about 1 μm in diameter.

11. The method according to claim 3, wherein said water-insoluble solvent is toluene.

12. A method for forming fine powder particles consisting essentially of particles whose diameters are not more than about 1 μm, which comprises:

(a) adding to a composition consisting essentially of water and a fine powder, a water-insoluble organic solvent at least in an amount sufficient to form an azeotrope with the water in said composition;

(b) converting the resulting mixed liquid into a W/O emulsion having minute ceramic particles contained in water droplets suspended in said emulsion; and (c) removing the water and organic solvent from the emulsion, to thereby obtain dry, fine powder particles.

* * * * *